United States Patent Office 3,755,527
Patented Aug. 28, 1973

3,755,527
PROCESS FOR PRODUCING MELT-BLOWN NON-WOVEN SYNTHETIC POLYMER MAT HAVING HIGH TEAR RESISTANCE
James P. Keller, James S. Prentice, and John W. Harding, Baytown, Tex., assignors to Esso Research and Engineering Company
Filed Oct. 9, 1969, Ser. No. 865,105
Int. Cl. D01d 5/12
U.S. Cl. 264—210 F                                14 Claims

ABSTRACT OF THE DISCLOSURE

A highly tear resistant nonwoven mat of thermoplastic polymer fibers is made in a melt-blowing process in which a molten polymeric resin is extruded through a row of die openings into a stream of hot gas which attenuates the resin into fibers having diameters between about 10–40 microns. The fibers are collected on a continuously moving surface positioned from about 10 to about 30 inches from the die openings.

BACKGROUND OF THE INVENTION

(1) Field of the invention

The present invention is directed to a melt-blowing process for producing highly tear resistant nonwoven mats composed of thermoplastic polymer fibers which have diameters from about 10 to about 40 microns.

(2) Description of the prior art

As exemplified by U.S. Pats. 3,276,944 and 3,341,394, other methods than melt-blowing have been used to prepare nonwoven mats of thermoplastic polymer fibers. A melt blowing process for producing polymer fibers of up to about 3 microns is disclosed in an article entitled, "Super-Fine Thermoplastics," by Van A. Wente, in Industrial and Engineering Chemistry, vol. 48, No. 8 (1956), pages 1342–1346. A British Pat. 1,055,187 discloses a blowing process used in the formation of nonwovens of melt spun fibers.

SUMMARY OF THE INVENTION

In this invention, a thermoplastic polymeric resin is extruded in molten form through a row of die openings in a die head into a converging stream of hot gas emerging from gas slots immediately above and below the row of die openings. The hot gas is moved at rates, relative to the rate of polymer flow, which attenuate the polymer into fibers having a diameter from about 10 to about 40 microns. The fibers, which are attenuated essentially in a plane away from the die openings, are collected as a non-woven mat on a continuously moving surface positioned from about 10 to about 30 inches or more from the die openings of the die head. In a specific aspect of the invention in which the fibers are polypropylene fibers, the melt blown nonwoven mat has a tear resistance of at least about 1000 dm.$^2$ and a strip tensile strength of no more than about 800 m.

DESCRIPTION OF THE PREFERRED EMBODIMENTS

Figure 1:
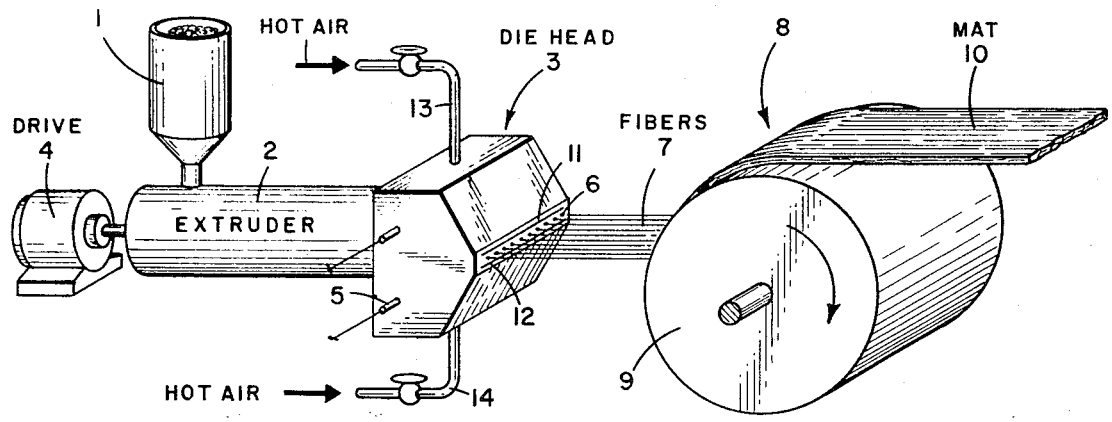
FIG. 1 is a schematic perspective view of the overall melt-blowing process.

Referring to FIG. 1 of the drawings, a thermoplastic polymer is introduced into a pellet hopper 1 of an extruder 2. The thermoplastic polymer is forced through the extruder 2 into a die head 3 by a drive 4. The die head 3 may contain heating means 5 which may control the temperature in the die head 3. The thermoplastic polymer is then forced out of a row of die openings 6 in the die head 3 into a gas stream which attenuates the thermoplastic polymer into fibers 7 which are collected on a moving collecting device 8 such as a drum 9 to form a continuous mat 10. The gas stream which attenuates the thermoplastic polymer is supplied through gas jets 11 and 12 respectively, which are more clearly seen in FIG. 2. The gas slots 11 and 12 are supplied with a hot gas, preferably air, by gas lines 13 and 14 respectively.

Figure 2:
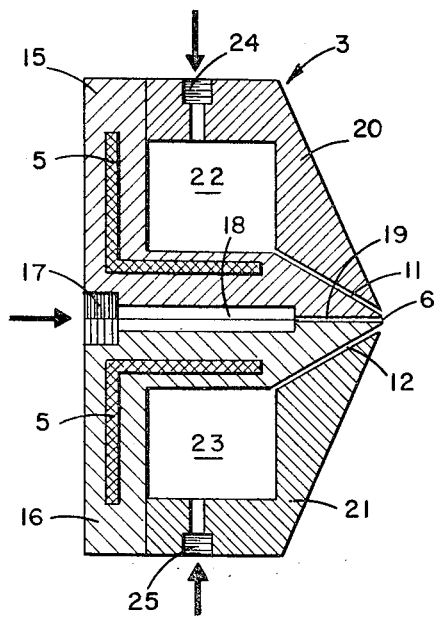
FIG. 2 is a detailed view in longitudinal cross section of a die which may be used in the melt-blowing process.

The process may be further understood by reference to the details of the die head 3, as more fully depicted in FIG. 2. The die head 3 is formed of upper die plate 15 and lower die plate 16. The thermoplastic polymer is introduced in the back of the die plates 15 and 16 through an inlet 17 as a result of the forcing action of extruder 2 at the back of the die plate 3. The thermoplastic polymer then goes into a chamber 18 between the upper and lower die plates 15 and 16 respectively. The facing of the die plate 16 may have milled grooves 19 which terminate in the die openings 6. It is understood, of course, that the milled grooves may be in the lower die plate 16 or the upper die plate 15, or that grooves may be milled in both plates 15 and 16. Still further, if a single plate is used in place of the upper and lower die plates, the grooves may be drilled to produce the die openings 6. An upper gas cover plate 20 and a lower gas cover plate 21 are connected to the upper die plate and lower die plate 15 and 16 respectively to provide an upper air chamber 22 and a lower air chamber 23 which terminate in the gas slots 11 and 12 respectively. The hot gas is supplied through inlet 24 and upper gas cover plate 20 and inlet 25 and lower gas cover plate 21. Suitable baffling means (not shown) may be provided in both the upper air chamber 22 and the lower air chamber 23 to provide a uniform flow of air through the gas slots 11 and 12 respectively. The die head 3 may contain heating means 5 for heating both the thermoplastic polymer and air in the die head 3.

The particular operating conditions employed in the melt-blowing process will control the characteristics of the nonwoven thermoplastic polymer mats produced by that process.

In accordance with this invention, it has been discovered that melt-blowing operations can be made to produce fibers of diameters from about 10 to about 40 microns and that nonwoven thermoplastic polymer mats of high tear resistance are made if those fibers are collected at a distance greater than 10 inches from the die openings.

In operating the melt-blowing process to produce fibers having diameters between about 10–40 microns, smooth molten flow of the polymeric resin of choice and smooth attenuation of the fibers is required. This is achieved through the selection and control of the appropriate combination of die tip temperature, resin flow rate, and resin molecular weight to give an apparent viscosity in the die holes of from about 10 to about 800 poise, preferably within the range of from about 50 to about 300 poise. For a particular resin, by measuring the pressure upstream of the die holes and by measuring the polymer flow rate, the apparent viscosity is calculated from the geometry of the die by methods well known in polymer rheology. See, e.g. both H. V. Boenig, Polyolefins, p. 264 (1966) and Chemical Engineering Handbook (Perry ed. 1950) at p. 375. The viscosity can usually be adjusted into the operable range by varying the die tip temperature.

Herein, polypropylene resin is used to illustrate the present invention. Other thermoplastic polymeric resins suitable for such use include other polyolefins, e.g., polyethylene; polyesters, e.g., poly(methylmethacrylate) and poly(ethyleneterephthalate); polyamides, e.g., poly(hexamethylene adipamide), poly($\omega$-caproamide) and poly(hexamethylene sebacamide); polyvinyls such as polystyrene; and other polymers such as polytrifluorochloroethylene.

To be melt blown into fibers, polypropylene, it has been found, must be thermally treated at temperatures in excess of 550° F., up to about 900° F. and preferably, within the range of from about 550 to about 800° F. The degree of thermal treatment necessary varies with the melt index of the particular polypropylene resin employed and with the rates used in the melt blowing process. The thermal treatment may be carried out in the extruder 2 alone or partially in the extruder and partially in the die head 6.

The polymer flow rate, the rate at which the polymer is forced through the die openings 6 in the die head 3, is dependent upon the specific design of the die head and extruder. However, suitable polymer flow rates are from about 0.07 to about 0.5 or more gm./min./opening. The polymer flow rate may be controlled by the speed of the extruder. The gas flow rates are also limited by the design of the die head. Suitable products have been obtained at air rates from about 0.2 to about 4 lbs./min.

The fiber diameters of the nonwoven mats of this invention are achieved by adjusting the gas flow rates for a given molten polymer flow rate so that one obtains a pounds of gas/pounds of polymer ratio of from about 10 to about 60, preferably, between about 25 and about 50. Air rates of this magnitude serve to attenuate the molten resin extruded through the die openings into fibers having diameters from about 10 to about 40 microns, usually from about 15 to about 25 microns. When the air rates for a given polymer flow rate are too low, large coarse fibers are formed which entwine into coarse, ropey bundles or "rope" that produces coarse, nonpliable, brittle, irregular mat structure. Then, as air flow rates are increased and pass though the range which provides the rope free, highly tear resistant nonwoven mats of this invention, so that the air rates are too high relative to the rate of polymer flow, the attenuated fibers break and become discontinuous and produce large objectionable "shot" in the nonwoven mat. The "shot" may be as large as 1 millimeter in diameter. If the mat is calendered, this type of "shot" appears as a large clear area in the mat, giving the mat a coarsely mottled appearance. At even higher air rates, relative to the polymer flow rate, "shot" gets much smaller and nonwoven mats composed of very fine fibers from about 1 to about 10 microns are formed having very poor tear resistance.

Aside from the rate of air flow relative to the rate of molten polymer flow, the single most important factor in producing the highly tear resistant nonwoven mat of this invention is the distance separating the collecting device 8 from the die openings 6 in the die head 3. Unless the contained heat of the deposited fibers is quenched by auxiliary cooling media applied to the collecting device 8, it is necessary to space the collecting device or collector at least about 10 inches from the die openings so that the fibers will dissipate most of their heat before deposition on the collector. At die-collector-distances of 10 or more inches, the fibers in nonwoven mats of the present invention are bound together essentially by entanglement, with little or no self-bonding, any self-bonding decreasing with increasing die-collector-distances. The term "self-bonding" herein means thermal bonding of one fiber to another as the nonwoven thermoplastic polymer mats are formed. Advantageously, the die-collector-distance is no greater than about 30 inches, and desirably it is from about 12 to about 24 inches, preferably, from about 18 to about 24 inches.

Polypropylene nonwoven mats which are prepared at die-collector-distances of from about 10 to about 30 inches under melt blowing conditions producing fiber diameters of 10–40 microns have tear resistances in excess of 1000 dm.$^2$, as measured by a standard Elmendorf tear strength tester in accordance with ASTM procedure D–689–62. The tear resistance of the preferred mats is greater than 2000 dm.$^2$ and may be 3000 dm.$^2$ or more. Tear resistance is reported in units of dm.$^2$, the result of dividing the average force necessary to tear the mat, in grams, by the basis weight of the mat, in grams per square meter, all of which is multiplied by 100. The strip tensile strength of these highly tear resistant nonwoven mats has rarely been found to exceed 700 m., as measured by ASTM procedure D–828–60 using a standard Instron tester with a two-inch jaw separation and an elongation rate of 250 percent per minute. The results of the strip tensile strength measurements are reported in meters, the unit resulting when the drawing necessary to break the mat, measured in grams, is divided by the width of the sample, measured in meters, and all of which is divided by the basis weight of the sample in grams per square meter. The nonwoven mats can be drawn in this test from about 200 to about 500 percent before breaking, evidence that very drawable fibers are formed by the melt-blowing conditions used to make the mats.

The nonwoven mats may be compacted at room temperature to densify them, if desired. Calender roll devices are suitable for this purpose.

The present invention is further illustrated by the following specific examples which are given by way of illustration only, and not as limitations on the scope of the invention.

EXAMPLES 1–7

The highly tear resistant nonwoven mats of the present invention are illustrated by Examples 1–7 presented in Table I hereinafter. The nonwoven mats of Examples 1–7 were made by the melt-blowing process which was illustrated in FIGS. 1 and 2 of the drawings, using the specific operating conditions set forth in Table I. The melt-blowing process of Example 1 employed a 4 inch long, 80 hole die head; that of Examples 2–7 used a 10 inch long, 200 hole die head. The melt blown mats were compacted prior to testing by calendering them at room temperature under a calender roll pressure of 500 pounds per linear inch and at a line speed of 20 feet per minute. The tear resistances, strip tensile strengths and percent elongations, and basis weights of the nonwoven mats which resulted are shown in Table I. The fibers of the mats had diameters within the range from about 10 to about 40 microns, usually from about 18 to about 25 microns.

TABLE I

| Example number | 1 | 2 | 3 | 4 | 5 | 6 | 7 |
|---|---|---|---|---|---|---|---|
| Polypropylene MFR | 33 | 33 | 33 | 33 | 33 | 33 | 33 |
| Extruder temp. (° F.) | 585 | 660 | 660 | 660 | 598 | 600 | 600 |
| Die temp. (° F.) | 525 | 560 | 567 | 563 | 560 | 553 | 553 |
| Polymer rate (gm./min.) | 8.5 | 20 | 21 | 21 | 21 | 21 | 21 |
| Air flow (lb./min.) | 0.82 | 1.4 | 1.4 | 1.4 | 1.4 | 0.9 | 0.9 |
| Lb. air/lb. polymer | 44 | 32 | 30 | 30 | 30 | 20 | 20 |
| Die collector distance (in.) | 12 | 18 | 18 | 18 | 18 | 18 | 18 |
| Nonwoven mat properties: | | | | | | | |
| Tear resistance (dm.$^2$) | 1,304 | 1,566 | 2,051 | 1,998 | 3,005 | 1,916 | 2,381 |
| Tensile strength (m.) | 584 | 692 | 594 | 588 | 639 | 422 | 555 |
| Percent elongation | | | 230 | 250 | 425 | 525 | 460 |
| Basis wt. (gm./m.$^2$) | 38 | 65 | 74 | 81 | 48 | 66 | 34 |

EXAMPLE 8

This example illustrates the different kind of mat characteristics which occur when the melt-blowing conditions are such as to produce fibers smaller than the present range of from about 10 to about 40 microns. The die-collector-distance is 12 inches in both cases.

TABLE II

| Example number | 8 | 1 |
|---|---|---|
| Polypropylene MFR | 0.6 | 33 |
| Extruder temp. (° F.) | 690 | 585 |
| Die temp. (° F.) | 632 | 525 |
| Polymer rate (gm./min.) | 8.4 | 8.5 |
| Air flow (lb./min.) | 4.15 | 0.82 |
| Lb. air/lb. polymer | 224 | 44 |
| Die collector distance (in.) | 12 | 12 |
| Nonwoven mat properties: | | |
| Tear resistance (dm.$^2$) | 409 | 1,304 |
| Tensile strength (m.) | 155 | 584 |
| Fiber diameter (microns) | 2.5 | 18.25 |
| Basis wt. (gm./m.$^2$) | 50 | 35 |

Clearly, the nonwoven mat of fibers of smaller diameter than 10 microns has a tear resistance very much lower than the tear resistance of the nonwoven mat prepared according to the present invention.

The high tear resistances of the present nonwoven mats makes them well suited for such applications as wrapping materials, clothing liners, diaper liners, components in laminates, and like articles requiring high tear strength.

Having fully and particularly described the highly tear resistant melt-blown nonwoven mats of this invention, and the method of producing such mats, it will be understood that variations and modifications can be made within the spirit and scope of the invention as defined in the appended claims.

We claim:

1. In a process for producing a melt-blown nonwoven mat wherein a fiber-forming thermoplastic polymer resin is extruded in molten form through orifices of a heated nozzle into a stream of hot gas to attenuate said molten resin as fibers in a fiber stream, said fibers being collected on a receiver in the path of said fiber stream to produce said nonwoven mat, the improvement of producing a melt-blown nonwoven mat having a tear resistance greater than 1000 dm.$^2$ and a tensile strength of less than 800 m., comprising:

subjecting said resin to thermal degradation prior to extrusion of said resin into said stream of hot gas until said resin is degraded to have a viscosity in said nozzle orifices of about 50 to about 300 poise during extrusion therethrough, extruding said degraded resin into said stream of hot gas at a resin flow rate of from about 0.07 to about 0.5 gram/minute/orifice.

flowing said stream of hot gas at a rate of from about 10 to about 60 pounds of gas per pound of polymer effective to attenuate said resin into fibers having diameters from about 10 to about 40 microns, and collecting said fibers on said receiver at a distance from said nozzle orifices effective to cause said fibers to be bound together essentially completely by self-entanglement.

2. The improved process of claim 1 in which said resin is subjected to a temperature within the range from about 550° F. to about 900° F. for a period of time effective to cause said thermal degradation of said resin until said resin has said viscosity.

3. The improved process of claim 2 wherein said thermoplastic polymer resin is selected from polyamides, polyesters, polystyrenes and polyolefins.

4. The improved process of claim 2 wherein said thermoplastic polymer resin is polypropylene.

5. The improved process of claim 1 wherein said resin is subjected to said thermal degradation at least partially in an extruder feeding said resin into said nozzle.

6. The improved process of claim 1 wherein said gas flow rate is from about 0.2 to about 4 pounds per minute.

7. The improved process of claim 1 wherein said flow rate is effective to attenuate said resin into fibers having diameters from about 15 to about 25 microns.

8. The improved process of claim 1 wherein said pounds of gas to pounds of polymer ratio is from about 25 to about 50.

9. The improved process of claim 1 wherein said distance of said receiver from said nozzle orifices is from about 10 to about 30 inches.

10. The improved process of claim 1 wherein said distance of said receiver from said nozzle orifices is from about 12 to about 24 inches.

11. The improved process of claim 1 in which said distance of said receiver from said nozzle orifices is from about 18 to about 24 inches.

12. In a process for producing a melt-blown nonwoven mat wherein a fiber-forming polypropylene resin is extruded in molten form through orifices of a heated nozzle into a stream of hot gas flowing in the same direction as said molten resin to attenuate said molten resin as fibers in a fiber stream, said fibers being collected on a receiver in the path of said fiber stream to form said nonwoven mat, the improvement of producing a melt-blown nonwoven polypropylene mat having a tear resistance of greater than 1000 dm.$^2$, and a strip tensile strength of less than 800 m., comprising:

subjecting said resin, prior to extrusion thereof into said stream of hot gas, to a temperature within the range from about 550° F. to about 900° F. for a period of time effective to thermally degrade said resin until said resin has a viscosity in said nozzle orifices of from about 50 to about 300 poise during extrusion therethrough, extruding said degraded resin through a row of said nozzle orifices into said stream of hot gas at a resin flow rate of from about 0.07 to about 0.5 gram/minute/orifice, flowing said stream of hot gas from gas slots immediately above and below of said row die openings at a pounds-of-air to pounds-of-polymer flow rate ratio of from about 10 to about 60 effective to attenuate said molten resin into polypropylene fibers having a diameter of from about 10 to about 40 microns, and collecting said polypropylene fibers on said receiver at a distance from said nozzle orifices of from about 10 to about 30 inches.

13. The improved process of claim 12 wherein said pounds of gas to pounds of polymer ratio is from about 25 to about 50.

14. The improved process of claim 13 wherein said distance from said nozzle orifices to said receiver is from about 12 to about 24 inches.

References Cited

UNITED STATES PATENTS

| | | | |
|---|---|---|---|
| 2,374,540 | 4/1945 | Hall | 264—DIG. 75 |
| 2,411,659 | 11/1946 | Manning | 264—DIG. 75 |
| 2,411,660 | 11/1946 | Manning | 264—DIG. 75 |
| 2,437,263 | 3/1948 | Manning | 264—DIG. 75 |
| 2,508,462 | 5/1950 | Marshall | 264—DIG. 75 |
| 2,724,216 | 11/1955 | Cisne | 264—DIG. 75 |
| 2,810,426 | 10/1957 | Till et al. | 264—DIG. 75 |
| 3,346,682 | 10/1967 | Thomson | 264—210 F |
| 3,379,811 | 4/1968 | Hartmann et al. | 264—210 F |
| 3,502,763 | 3/1970 | Hartmann et al. | 264—210 F |
| 3,013,003 | 12/1961 | Maragliano et al. | 264—211 |
| 3,143,584 | 8/1964 | Roberts et al. | 264—211 |
| 3,432,590 | 3/1969 | Papps | 264—210 F |
| 3,441,468 | 4/1969 | Siggel et al. | 264—171 |
| 3,543,332 | 12/1970 | Wagner et al. | 264—210 F |
| 3,048,467 | 8/1962 | Roberts et al. | 264—210 F |
| 3,233,023 | 2/1966 | Benson | 264—168 |
| 3,631,160 | 12/1971 | Polestak et al. | 264—210 F |

OTHER REFERENCES

"Superfine Thermoplastic Fibers," by Wente, Ind. Eng. Chemistry, 48 (8): 1342–1346 (August 1956).

JAY H. WOO, Primary Examiner

U.S. Cl. X.R.

264—176 F; 156—167, 244